Dec. 22, 1931.  C. J. ROCQUIN  1,837,677
RAKE
Filed March 2, 1929
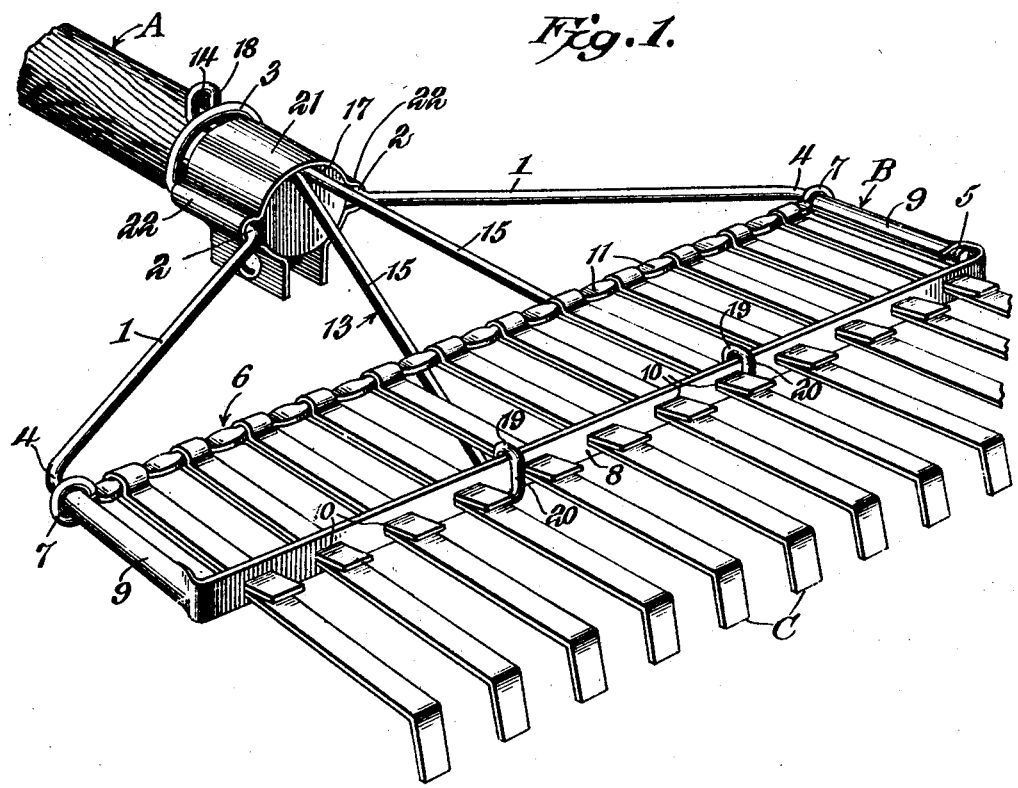
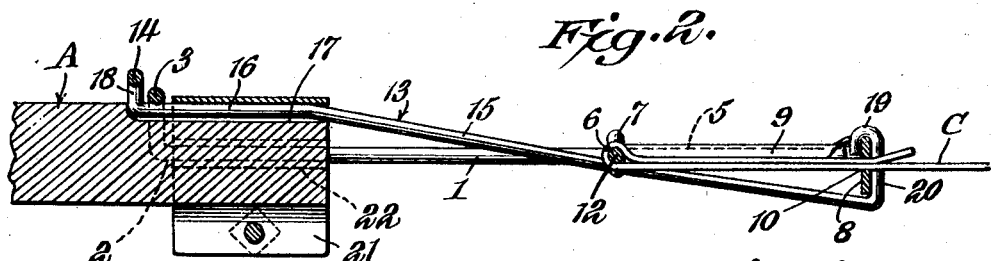
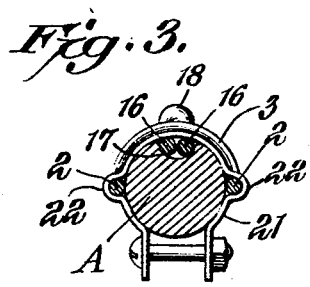
Inventor,
Camille J. Rocquin,
By Baldwin Wight
Attorneys.

Patented Dec. 22, 1931

1,837,677

UNITED STATES PATENT OFFICE

CAMILLE J. ROCQUIN, OF NEW ORLEANS, LOUISIANA

RAKE

Application filed March 2, 1929. Serial No. 343,911.

My invention relates to rakes, and more particularly to that type of rake in which a plurality of longitudinally extending flexible tines are connected to a supporting frame which is in turn attached to a handle. My invention embodies improvements in the rake shown and described in my application for Letters Patent Serial No. 241,384, filed December 20, 1927.

In the rake described in said application the supporting frame includes a pair of forwardly extending side arms and a front cross bar having rearwardly extending tubular arms telescopically connected to the side arms, the telescopic connection being maintained against separation by the frictional contact of the tubular arms of the cross bar with the side arms. It has been found desirable that means be provided for positively retaining the front cross bar against forward movement relative to the side arms in order that the telescopic connection be maintained against separation.

I have also found it desirable that such rakes be provided with additional means for stiffening the supporting frame in order that the handle, the frame, and the tines will be maintained in the desired relative positions.

It is accordingly an object of my invention to provide such a rake with means connected to the rake handle and to the rake frame for stiffening the frame and relieving the latter of strains to which the frames of rakes of this character heretofore constructed have been subjected, and for retaining the front cross bar against forward movement relative to the side arms.

With this and other objects in view, the nature of which will more fully appear, my invention will be understood from a reading of the following description, the appended claims, and the several views illustrated in the drawings, in which:

Figure 1 is a perspective view of a rake embodying my invention;

Figure 2 is a central vertical sectional view thereof;

Figure 3 is a sectional view, taken on the line 3—3 of Figure 2, and

Figure 4 is a detail view of a portion of a rear cross bar, showing deformations formed therein.

Like numerals designate corresponding parts in the several views of the drawings.

In the drawings there is shown a rake embodying my invention and including a handle A, a frame B connected to the front end of the handle, and a plurality of tines C connected to the frame B.

The frame B includes a pair of forwardly extending side arms 1—1 which terminate at their rear ends in substantially parallel attaching portions 2—2 disposed on opposite sides of the handle A and connected together by a substantial semi-circular connecting portion 3 fitting over the handle A. The side arms 1—1 are respectively bent adjacent their front ends as at 4—4 to bring the end portions 5—5 of the arms into substantial parallelism.

A rear cross bar 6 is rigidly connected at its respective ends to the parallel end portions 5—5 of the side arms adjacent the bends 4—4, preferably by bending the ends of the cross bar around said parallel portions as at 7—7.

A flat front cross bar 8 formed of sheet material and having its flat faces disposed in a plane perpendicular to the center-line of the handle is provided with rearwardly extending arms 9—9, which arms are formed into tubular shape to telescopically engage the parallel end portions 5—5 of the side arms.

The front cross bar 8 is provided with a series of longitudinally spaced openings 10 for receiving the tines C, and the rear cross bar 6 is provided with a series of spaced flattened portions 11 which provide resultant intermediate seats 12 to which the rear ends of the tines C are secured.

The rake frame is further provided with stiffening means 13 which includes a metal rod bent upon itself as at 14 to form a pair of forwardly extending and diverging frame stiffening arms 15—15 rigidly secured at their rear ends to the handle and at their front ends to the front cross bar at points respectively on opposite sides of and substantially equidistant from the center of the cross bars. Preferably the arms 15—15 are bent into parallelism adjacent the bend 14 in order to provide attaching portions 16 seated in a longitudinal groove 17 formed in the front end of the handle A and between the handle and the semi-circular connecting portion 3. The extreme rear ends of the attaching portions 16 are bent upwardly to provide an upstanding keeper 18 disposed in rear of and in engagement with the semi-circular connecting portion 3. It will be seen that due to the engagement of the keeper with the semi-circular portion the stiffening arms will be held against forward movement relative to the side arms.

Forwardly of the attaching portions 16, the main portions of the arms 15—15 extend downwardly and outwardly, as well as forwardly. These arms are disposed below and contact with the rear cross bar 6 and at their outer ends pass under and contact the bottom edge of the front cross bar. The arms are rigidly connected to the cross bar by means of hooks 19—19 formed at the front ends of the arms and having shanks 20—20, which shanks are bent upwardly to engage the outer face of the cross bar and to cause the curved portion of the hooks to engage the top edge and the rear face of the cross bar.

For attaching the frame to the handle there is provided a clamp 21 adapted to fit substantially around the handle and to bind the attaching portions 2—2 of the side arms and the attaching portions 16—16 of the frame stiffening arms against the handle. Preferably the clamp is provided with oppositely and longitudinally disposed substantially tubular recesses 22—22 for receiving the attaching portions 2 of the side arms, thus permitting the clamp to fit snugly around the handle.

From the foregoing it is apparent that the frame stiffening arms 15 support the front cross bar at points intermediate its ends and prevent deformation of the cross bar when the tines connected to the cross bar near its center point are deflected either upwardly or downwardly. The frame stiffening arms also serve to hold the rear cross bar against undue downward flexing. A further useful purpose of the frame stiffening arms is that of maintaining the telescopic connection between the front cross bar and the side arms of the frame against separation when the rake is being used. It is apparent that, since the frame stiffening arms cannot move forwardly with respect to the side arms because of the engagement of the keeper 18 with the semi-circular connection portion 3, and since the frame stiffening arms are rigidly connected at their front ends to the front cross bar, the latter cannot move forwardly with respect to the side arms. In other words, the front cross bar cannot tend to separate from the side arms so as to disengage the rearwardly extending tubular arms of the cross bar from the parallel end portions 5 of the side arms.

I claim:

1. In a rake, the combination with a handle; of a frame connected to the handle and including a pair of spaced forwardly extending side arms, spaced front and rear cross bars connected to said side arms, and a frame stiffening arm rigidly secured to the handle and connected to said front cross bar intermediate the opposite ends of the latter, said arm being disposed below and in contact with said rear cross bar for resisting downward flexing of said bar; and a plurality of forwardly extending tines connected to said cross bars.

2. In a rake, the combination with a handle; of a frame connected to the handle and including a pair of spaced forwardly extending side arms connected by a substantially semi-circular portion adapted to fit over said handle, spaced front and rear cross bars connected to said side arms, and a frame stiffening arm connected at its front end to said front cross bar intermediate the opposite ends thereof, and having its rear end portion disposed between the handle and said semi-circular connecting portion; a clamp embracing the handle and the inner end portions of the side arms; and a plurality of forwardly extending tines connected to said cross bars.

3. In a rake, the combination with a handle of a frame including a pair of spaced forwardly extending side arms connected by a substantially semi-circular portion adapted to fit over said handle, spaced front and rear cross bars connected to said side arms, and a frame stiffening arm connected at its front end to said front cross bar intermediate the opposite ends thereof, and having its rear end portion disposed between the handle and said semi-circular connection portion; an upstanding keeper at the rear end of said arm and adapted to engage said circular connecting portion for retaining the arm against forward longitudinal movement relative to the side arms; a clamp embracing the handle and the inner end portions of the side arms; and a plurality of forwardly extending tines connected to said cross bars.

4. In a rake, the combination with a handle having a longitudinal groove in its front end; of a frame connected to the handle and including a pair of spaced forwardly extending side arms connected by a substantially semi-circular portion adapted to fit over said handle, spaced front and rear cross bars connected to said side arms, and a frame stiffening arm connected at its front end to said front cross bar intermediate the opposite ends thereof, and having its rear end portion disposed between the bottom of said groove and said semi-circular connection portion; a clamp embracing the handle and the inner end portions of the side arms; and a plurality of forwardly extending tines connected to said cross bars.

5. In a rake, the combination with a handle; of a frame connected to the handle and including a pair of spaced, forwardly extending side arms, a rear cross bar disposed between said side arms, and having its opposite ends respectively connected thereto, a front cross bar provided with rearwardly extending arms having telescopic connection with said side arms, and a forwardly extending frame-stiffening arm connected at its rear end to the handle and at its front end to said front cross bar for maintaining said telescopic connection; and a plurality of forwardly extending tines connected to said cross bars.

6. In a rake, the combination with a handle; of a frame connected to the handle and including a pair of spaced forwardly extending side arms connected by a substantially semi-circular portion fitting over said handle, spaced front and rear cross bars connected to the side arms, and a pair of forwardly diverging frame stiffening arms, the arms of said pair being connected at their rear ends to the handle and at their front ends to said front cross bar, the points of connection between the front ends of the stiffening arms and said cross bar being on opposite sides of and substantially equidistant from the center of the front cross bar, said pair of arms being formed of a single piece of metal bent to form a pair of forwardly extending substantially parallel attaching portions and a pair of forwardly, outwardly, and downwardly extending main portions, the rear ends of said parallel portions being bent upwardly to provide a keeper for engagement with said semi-circular connecting portion for retaining said pair of arms against forward movement relative to the handle; and a plurality of forwardly extending tines connected to said cross bars.

7. In a rake, the combination with a handle; of a frame connected to the handle and including a pair of spaced, forwardly extending side arms, a flat cross bar formed of sheet metal connected to said side arms and having its flat faces perpendicular to the center line of the handle, and a frame stiffening arm connected at its rear end to the handle and having its front end portion disposed below and in contact with the lower edge of the cross bar, the front end of the arm being formed with a hook having its shank bent upwardly to contact one face of the cross bar and to cause the curved portion of the hook to embrace the top edge and the rear face of the cross bar; and a plurality of forwardly extending tines connected to the cross bar.

8. In a rake, the combination with a handle provided with a longitudinal groove in its front end; of a frame including a pair of spaced forwardly extending side arms connected at the rear ends by a substantially semi-circular portion fitting over said handle and extending across the groove therein, a cross bar connected to said side arms, a frame stiffening arm connected at its front end to said cross bar, and having its rear end portion disposed between the bottom of said groove and said semi-circular portion, an upstanding keeper at the rear end of said arm and disposed in rear of and engaging said semi-circular portion; a clamp for bending the side arms and the frame stiffening arms against the handle; and a plurality of forwardly extending tines connected to said cross bar.

9. In a rake, the combination with a handle; of a frame connected thereto and comprising a pair of forwardly extending side arms rigidly connected to the handle; a cross bar having rearwardly extending arms telescopically engaged with the front ends of the side arms; a plurality of tines carried by the frame and each being connected to the cross bar; and a forwardly extending arm rigidly connected at its rear end with the handle and at its front end being directly and rigidly connected with the cross bar to retain the latter in operative engagement with the front ends of the side arms.

10. In a rake, the combination with a handle; of a frame connected thereto and comprising a pair of forwardly extending side arms rigidly connected to the handle; a cross bar having rearwardly extending arms telescopically engaged with the front ends of the side arms; a rear cross bar connected to the side arms; a plurality of tines connected to and supported by said front and rear cross bars; and an arm connected to the handle and to the front cross arm to retain the latter in operative engagement with the front ends of the side arms, said forwardly extending arm extending under and contacting the rear cross bar to resist downward flexing thereof.

11. In a rake, the combination with a handle; of a frame including a pair of spaced forwardly extending side arms having their rear ends rigidly connected to the front end of the handle at opposite sides thereof, spaced front and rear cross bars connected to said side arms, and a downwardly and forwardly inclined frame stiffening arm rigidly secured at its rear end to the top of the handle at the front end thereof and connected to the front cross bar intermediate the opposite ends of the latter, said stiffening arm extending under and engaging the rear cross bar; and a plurality of forwardly extending tines connected to said cross bars.

12. In a rake, the combination with a handle; of a frame including a pair of spaced forwardly extending side arms having their rear ends rigidly connected to the front end of the handle at opposite sides thereof, a cross bar connected to said side arms, and a downwardly and forwardly inclined frame stiffening arm rigidly secured at its rear end to the top of the handle at the front end thereof and connected to the cross bar intermediate the opposite ends of the latter; and a plurality of forwardly extending tines carried by the frame and each being connected to said cross bar.

In testimony whereof, I have hereunto subscribed my name.

CAMILLE J. ROCQUIN.